United States Patent
Saiki

(10) Patent No.: US 7,972,464 B2
(45) Date of Patent: Jul. 5, 2011

(54) MAT MEMBER, METHOD OF FABRICATING MAT MEMBER, EXHAUST GAS TREATING APPARATUS, AND SILENCING DEVICE

(75) Inventor: Kenzo Saiki, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 478 days.

(21) Appl. No.: 12/106,149

(22) Filed: Apr. 18, 2008

(65) Prior Publication Data

US 2009/0084268 A1 Apr. 2, 2009

(30) Foreign Application Priority Data

Sep. 28, 2007 (JP) ................... 2007-255890

(51) Int. Cl.
*B29C 65/48* (2006.01)
*B05D 7/00* (2006.01)

(52) U.S. Cl. ........ 156/296; 422/179; 427/212; 427/243; 428/74; 428/192; 428/193

(58) Field of Classification Search .................. 422/179; 156/296; 427/209, 212, 243, 244; 428/74, 428/192, 193, 194
See application file for complete search history.

(56) References Cited

U.S. PATENT DOCUMENTS

| | | | | |
|---|---|---|---|---|
| 5,008,086 A | * | 4/1991 | Merry | 422/180 |
| 5,332,609 A | * | 7/1994 | Corn | 428/77 |
| 6,191,057 B1 | * | 2/2001 | Patel et al. | 442/398 |
| 6,245,301 B1 | * | 6/2001 | Stroom et al. | 422/179 |
| 7,060,155 B2 | * | 6/2006 | Dong et al. | 156/278 |
| 7,572,415 B2 | | 8/2009 | Fukushima | |
| 2003/0049180 A1 | | 3/2003 | Fukushima | |
| 2004/0118511 A1 | | 6/2004 | Dong et al. | |
| 2005/0158521 A1 | * | 7/2005 | Sanyal | 428/192 |
| 2006/0278323 A1 | | 12/2006 | Eguchi | |
| 2009/0049690 A1 | | 2/2009 | Eguchi | |
| 2009/0208384 A1 | * | 8/2009 | Merry | 422/179 |

FOREIGN PATENT DOCUMENTS

| | | |
|---|---|---|
| CN | 2408240 | 11/2000 |
| CN | 1419627 | 5/2003 |
| CN | 1876748 | 12/2006 |
| JP | 8-61054 | 3/1996 |
| JP | 2003-293756 | 10/2003 |
| JP | 2005-194904 | 7/2005 |

* cited by examiner

*Primary Examiner* — Robert A Clemente
(74) *Attorney, Agent, or Firm* — Ditthavong Mori & Steiner, P.C.

(57) ABSTRACT

A mat member includes inorganic fibers, a first main surface, a second main surface opposite to the first main surface, an edge surface surrounding the first main surface and the second main surface, and an inorganic fiber scattering reduction unit. The inorganic fiber scattering reduction unit is provided on at least a part of the edge surface of the mat member and configured to reduce scattering of the inorganic fibers.

3 Claims, 9 Drawing Sheets

MAT MEMBER, METHOD OF FABRICATING MAT MEMBER, EXHAUST GAS TREATING APPARATUS, AND SILENCING DEVICE

CROSS-REFERENCE TO RELATED APPLICATIONS

The present application claims priority under 35 U.S.C. §119 to Japanese Patent Application No. 2007-255890 filed on Sep. 28, 2007. The contents of this application are incorporated herein by reference in their entirety.

BACKGROUND OF THE INVENTION

1. Field of the Invention

The present invention relates to mat members, an exhaust gas treating apparatus, and a silencing device.

2. Discussion of the Background

The number of automobiles has been rapidly increasing since the beginning of this century. Accordingly, the amount of exhaust gas discharged from internal combustion engines of automobiles has also been rapidly increasing. Particularly, various substances included in exhaust gas from diesel engines cause pollution, and thus have an increasingly serious impact on the global environment today.

Under such circumstances, various exhaust gas treating apparatuses have been proposed and put into practice. In a typical exhaust gas treating apparatus, a cylindrical member (casing) is provided in the middle of an exhaust pipe connected to an exhaust gas manifold of an engine. Inside the casing, there is an exhaust gas treating body with opening faces corresponding to the inlet and the outlet for exhaust gas, which exhaust gas treating body includes multiple microscopic cavities. Examples of the exhaust gas treating body are a catalyst carrier and an exhaust gas filter such as a diesel particulate filter (DPF). In the case of a DPF, due to the above structure, as the exhaust gas is discharged through the inlet opening face and the outlet opening face of the exhaust gas treating body, particulates are trapped in the walls around the cavities. Thus, the particulates can be removed from the exhaust gas.

A holding seal member is typically provided between the exhaust gas treating body and the casing. The holding seal member prevents the exhaust gas treating body from breaking as a result of contacting the casing, which may occur while a vehicle is traveling. The holding seal member also prevents exhaust gas from leaking through a gap between the casing and the exhaust gas treating body. The holding seal member also prevents the exhaust gas treating body from being disengaged due to exhaust gas pressure. Furthermore, the exhaust gas treating body needs to be maintained at high temperature in order to maintain reactivity, and therefore the holding seal member is required to have heat insulation properties. In order to satisfy such requirements, there are mat members made of inorganic fiber such as alumina fiber.

The mat member is wound around at least a part of the peripheral surface of the exhaust gas treating body excluding the opening faces, and is integrally fixed to the exhaust gas treating body with the use of taping or the like, thereby functioning as a holding seal member. Then, this integrated component is press-fitted inside the casing, thereby configuring an exhaust gas treating apparatus.

The mat member includes multiple microscopic inorganic fibers (usually having a diameter of 3 μm through 8 μm). Such inorganic fibers frequently foul the operational environment. For example, while an operator is handling the mat member, the inorganic fibers become detached from the mat member and scatter around the surrounding environment.

In order to reduce inorganic fibers that scatter while the mat member is being handled, there have been technologies proposed for providing films made of high polymer resin on the front and back sides of the mat member (see patent Japanese Laid-Open Patent Application No. H8-61054 and Japanese Laid-Open Patent Application No. 2003-293756).

The contents of Japanese Laid-Open Patent Application No. H8-61054 and Japanese Laid-Open Patent Application No. 2003-293756 are incorporated herein by reference in their entirety.

SUMMARY OF THE INVENTION

The present invention provides a mat member, a method of fabricating the mat member, an exhaust gas treating apparatus, and a silencing device.

According to an embodiment of the present invention, a mat member includes inorganic fibers, a first main surface, a second main surface opposite to the first main surface, an edge surface surrounding the first main surface and the second main surface, and an inorganic fiber scattering reduction unit. The inorganic fiber scattering reduction unit is provided on at least a part of the edge surface of the mat member and configured to reduce scattering of the inorganic fibers.

An embodiment of the present invention provides a method of fabricating a mat member including inorganic fibers. The method includes providing a first main surface and a second main surface, and an edge surface surrounding the first main surface and the second main surface. The method further includes providing an inorganic fiber scattering reduction unit on at least a part of the edge surface of the mat member, which inorganic fiber scattering reduction unit is configured to reduce scattering of the inorganic fibers.

According to one embodiment of the present invention, it is possible to provide a mat member in which scattering of inorganic fibers is significantly reduced while the mat member is being handled. Furthermore, it is possible to provide a method of fabricating such a mat member, and an exhaust gas treating apparatus including such a mat member functioning as a holding seal member and/or a heat insulator. Moreover, it is possible to provide a silencing device including such a mat member functioning as a sound absorbing member.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE EMBODIMENTS

A description is given, with reference to the accompanying drawings, of an embodiment of the present invention.

It was found that even if the mat member is provided with films made of high polymer resin on its front and back sides, many inorganic fibers scatter while the mat member is being handled. As discussed later with reference to FIG. 1, in order to confirm the effects of a conventional measure for reducing the scattering of inorganic fibers (i.e., the technology of providing high polymer resin films on the front and back sides), the amount of inorganic fibers that scatter from such a mat member was measured. The method of an inorganic fiber scattering test is described below.

Results obtained from this measurement say that with a conventional method of providing films on the front and back sides of the mat member, the amount of scattering inorganic fibers cannot be sufficiently reduced. Therefore, it was confirmed that there is a need for a measure to further reduce the amount of scattering inorganic fibers.

Figure 2:
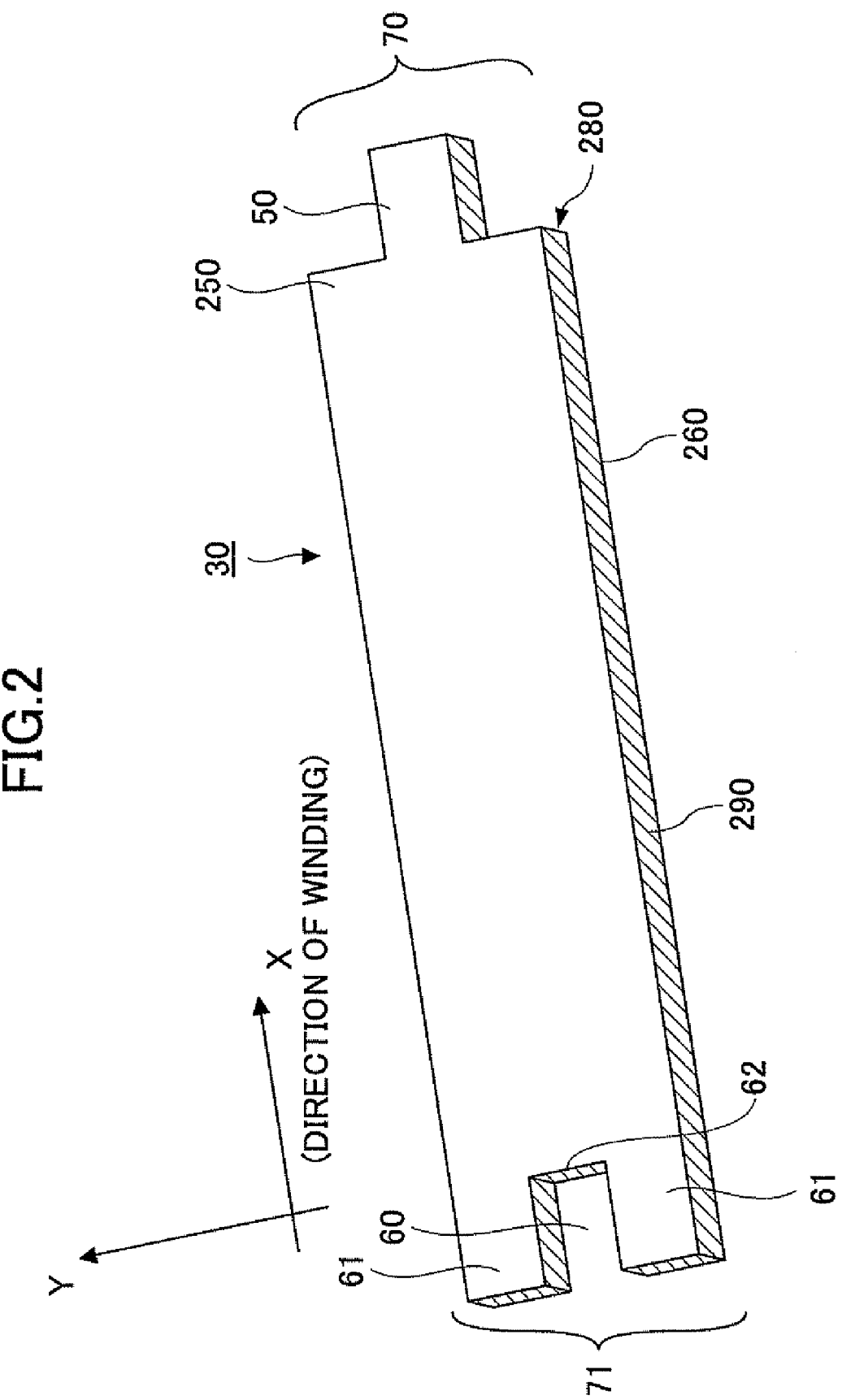
FIG. 2 illustrates a mat member according to an embodiment of the present invention.
Figure 3:
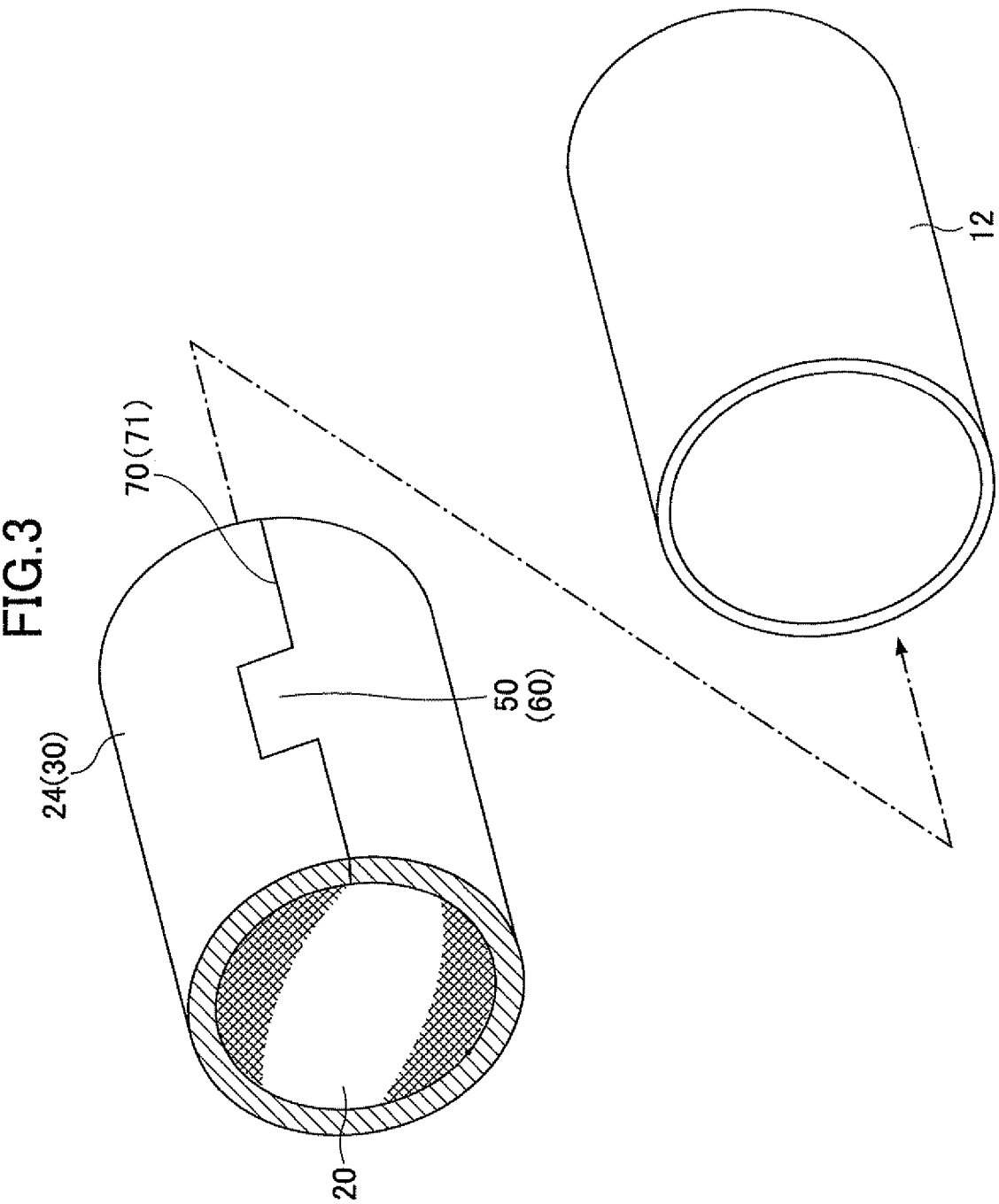
FIG. 3 illustrates an exhaust gas treating apparatus in which the mat member according to the present invention is used as a holding seal member.

FIG. 2 illustrates an example of a mat member according to an embodiment of the present invention. FIG. 3 is a disassembled view of an exhaust gas treating apparatus including the mat member according to an embodiment of the present invention as a holding seal member.

Typically, a mat member 30 according to the present invention includes multiple microscopic inorganic fibers (usually having a diameter of approximately 3 μm through 8 μm) made of, for example, alumina and silica, and a predetermined amount (for example, approximately 1% weight ratio) of organic binder (hereinafter, also referred to as "second organic binder").

Furthermore, as shown in FIG. 2, the mat member 30 according to the present invention includes first and second main surfaces 250 and 260, which are surrounded by edge surfaces 280. Furthermore, the mat member 30 has a substantially rectangular shape including long sides (sides parallel to an X direction) and short sides (sides parallel to a Y direction). Short sides 70 and 71 include a mating protruding part 50 and a mating receding part 60, respectively. Furthermore, two protruding parts 61 are formed at positions adjacent to the mating receding part 60 of the short side 71. However, the short sides 70 and 71 of the mat member 30 according to the present invention are not limited to the shape shown in FIG. 2; the short sides 70 and 71 can have no mating parts shown in the figure, or the short sides 70 and 71 can include plural mating protruding parts 50 and plural mating receding parts 60, respectively. In the present application, "a substantially rectangular shape" can include a shape in which the angle of each corner, where the long side and the short side meet, is other than approximately 90 degrees (for example, the corner can have a curvature).

When this mat member 30 is used as a holding seal member 24, it is used in such a manner that its long sides are wound around (in the X direction). When the mat member 30 is used as the holding seal member 24 that is wound around an exhaust gas treating body 20 such as a catalyst carrier, as shown in FIG. 3, the mating protruding part 50 and the mating receding part 60 are mated to each other so that the mat member 30 is fixed to the exhaust gas treating body 20. Then, the exhaust gas treating body 20 with the holding seal member 24 wound therearound is inserted inside a cylindrical casing 12 made of metal or the like by a press-fitting method.

Referring back to FIG. 2, the mat member 30 according to the present invention has an inorganic fiber scattering reduction unit 290 provided around the entirety of the peripheral edge surfaces 280 of the mat member 30 for preventing the inorganic fibers from scattering.

As described above, a typical mat member includes multiple microscopic inorganic fibers. Therefore, with a conventional mat member, inorganic fibers become detached from the mat member while an operator is handling the mat member, and the inorganic fibers scatter in the surrounding environment.

Figure 1:
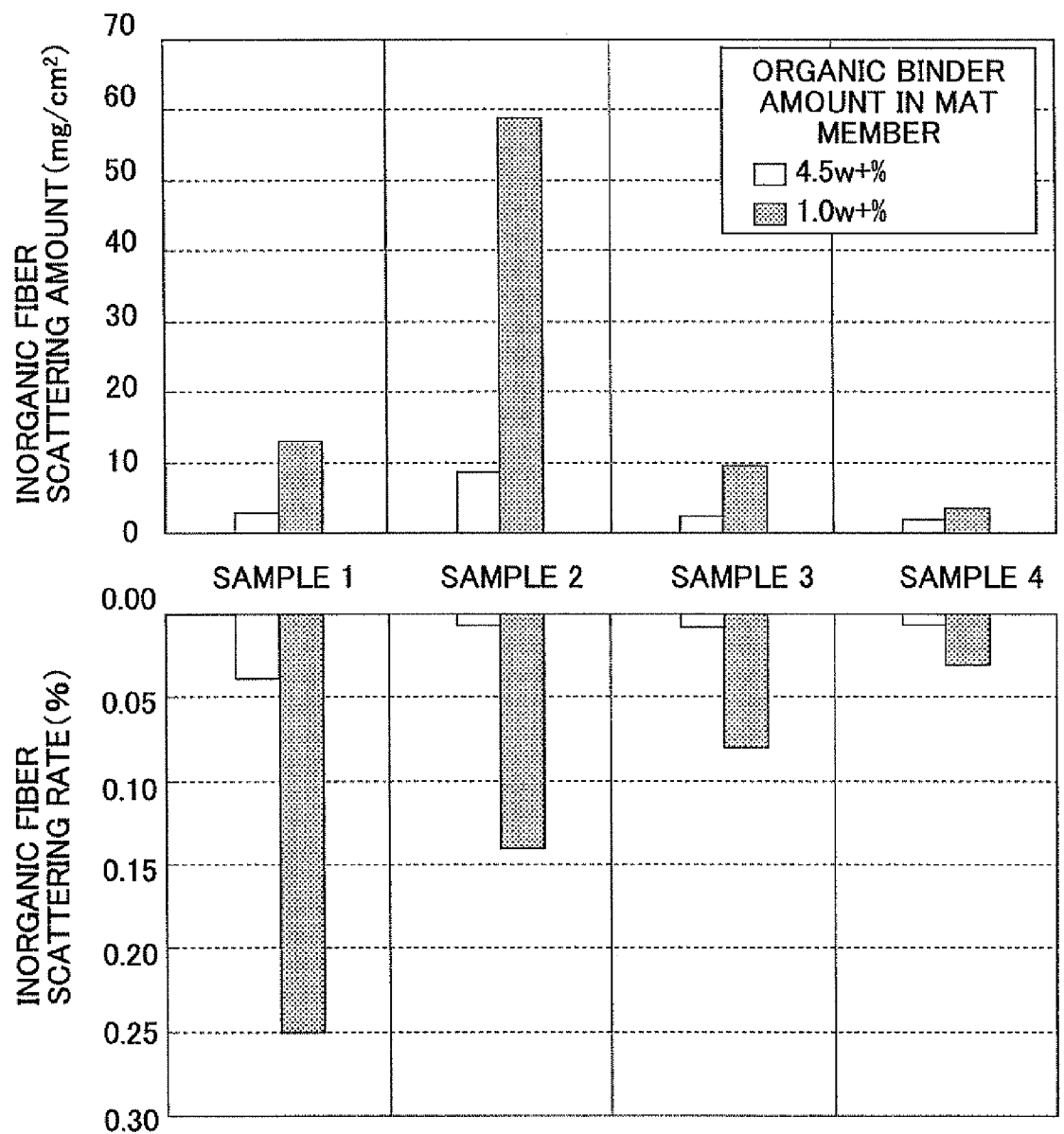
FIG. 1 indicates inorganic fiber scattering amounts (top graph) and inorganic fiber scattering rates (bottom graph) of a sample that is not masked, and samples in which predetermined portions (the first main surface and the second main surface, the first main surface and the edge surface, and the second main surface and the edge surface) are masked.

FIG. 1 illustrates the inorganic fiber scattering amount (top graph) and the inorganic fiber scattering rate (bottom graph) measured by performing an inorganic fiber scattering test (details described below) on mat members each having a size of approximately 100 mm × approximately 100 Mm × approximately 7.1 mm, which are masked by high polymer films at predetermined portions (the first main surface and the second main surface, the first main surface and the edge surface, and the second main surface and the edge surface), or not masked at all. In FIG. 1, sample 1 is a mat member that is not masked at all. In sample 2, the first and second main surfaces are masked, with only the peripheral edge surface being exposed. In sample 3, the first main surface and the peripheral edge surface are masked, with only the second main surface being exposed. In sample 4, the second main surface and the peripheral edge surface are masked, with only the first main surface being exposed. The inorganic fiber scattering amount of the vertical axis in the top graph represents the weight of the inorganic fibers that have scattered with respect to the surface area of the non-masked region (exposed face) of the mat member. The inorganic fiber scattering rate of the vertical axis in the bottom graph represents the wt % of scattered inorganic fibers with respect to the total weight of the mat member. The bar on the left side (white bar) for each sample indicates measurement results of a mat member that is impregnated with organic binder corresponding to approximately 4.5 wt % with respect to the total weight. The bar on the right side (bar with pattern) for each sample indicates measurement results of a mat member that is impregnated with organic binder corresponding to approximately 1.0 wt % with respect to the total weight.

Surprisingly, the results say that the inorganic fiber scattering amount is largest for sample 2, which corresponds to the conventional mat member in which films are provided on the first main surface and the second main surface. This result is particularly significant for mat members including a small amount of organic binder (approximately 1.0 wt %). Meanwhile, with regard to sample 3 (or sample 4) corresponding to the mat member having masked edge surfaces, the inorganic fiber scattering amount is less than or equal to that of sample 1. This suggests that the inorganic fibers primarily scatter from the edge surface of the mat member, not from the first main surface or second main surface of the mat member.

This is probably attributed to the fact that the mat member is cut at the edge surfaces. At these portions, multiple inorganic fibers are cut away from the network of inorganic fibers. Therefore, the binding force between fibers is weak at the edge surfaces of the mat member, which causes inorganic fibers to stick out or become detached. It is considered that, for this reason, a large amount of inorganic fibers scatter from the edge surfaces while the mat member is being handled. Each mat member of all of the samples is impregnated with a predetermined amount (approximately 1 wt % or approximately 4.5 wt %) of organic binder from the side of the first main surface. Therefore, the difference between samples 3 and 4 is attributed to the deviation distribution of the organic binder inside the mat member (in the thickness direction). That is, the amount of organic binder tends to be larger toward the first main surface (on which the organic binder is applied), compared to portions closer to the second main surface of the mat member. This is probably why there is a difference between samples 3 and 4 in terms of the amount of scattering inorganic fibers.

These results suggest that the conventional method of providing high polymer films on the first and/or the second main surfaces of the mat member is not capable of sufficiently and effectively preventing inorganic fibers from scattering from the mat member. Particularly, in consideration of environmental issues, those engaged in the field of exhaust gas treatment for vehicles are making studies to reduce the amount of organic binder included in the holding seal member from the current approximately 4.5 wt % to, for example, approximately 1 wt %, in order to reduce the amount of organic elements emitted from the exhaust gas treating apparatus during usage. If the amount of organic binder to impregnate the mat member is reduced by such a policy, it is expected that more inorganic fibers will scatter from the edge surface of the mat member based on the results shown in FIG. 1.

Meanwhile, it can be anticipated from the results shown in the bottom graph in FIG. 1 (particularly with respect to sample 3 or 4) that inorganic fibers can be prevented from scattering more effectively by covering the edge surface of the mat member by some method.

In an embodiment of the present invention, the edge surfaces of the mat member, from which inorganic fibers primarily scatter, is treated so that inorganic fibers are prevented from scattering. Accordingly, the present invention has been made to prevent inorganic fibers from scattering by the most immediate and effective method. For example, as shown in FIG. 2, the inorganic fiber scattering reduction unit 290 is formed around the entirety of the peripheral edge surfaces 280 of the mat member. In this case, inorganic fibers are prevented from scattering from the edge surfaces 280 of the mat member, and therefore it is possible to sufficiently and effectively prevent inorganic fibers from scattering from the mat member while being handled.

The inorganic fiber scattering reduction unit 290 can have any configuration as long as it can reduce the amount of inorganic fibers scattering from the edge surfaces of the mat member. For example, the inorganic fiber scattering reduction unit 290 can be realized by providing a film such as a high polymer film onto the edge surfaces 280, or by applying an organic binder (this is also referred to as a "first organic binder" in order to be distinguished from the aforementioned "second organic binder" that is applied to a regular mat member on the first main surface so as to impregnate the inside of the mat member) onto the edge surfaces 280.

Furthermore, in the example shown in FIG. 2, the inorganic fiber scattering reduction unit 290 is provided along the entirety of the peripheral edge surfaces 280 of the mat member; however, an embodiment of the present invention is not limited to such a configuration. That is, as long as the amount of inorganic fibers scattering from the mat member can be reduced compared to the conventional technology, the inorganic fiber scattering reduction unit 290 can be formed only on a part of the edge surfaces 280 of the mat member. For example, in a provisional calculation, as described below, as long as the inorganic fiber scattering reduction unit 290 is present on 75% of the entire area of the peripheral edge surfaces 280 of the mat member, the amount of inorganic fiber scattering from the mat member can be reduced compared to a conventional mat member in which high polymer films are provided on the first and second main surfaces. Such an embodiment is particularly effective for further reducing the total amount of organic elements included in a mat member.

In a mat member having a high polymer film provided on its main surface, this main surface conceptually corresponds to the "inorganic fiber scattering reduction unit". Accordingly, in the following description, the main surface of the mat member including a high polymer film may be referred to as the "inorganic fiber scattering reduction unit".

Figure 4:
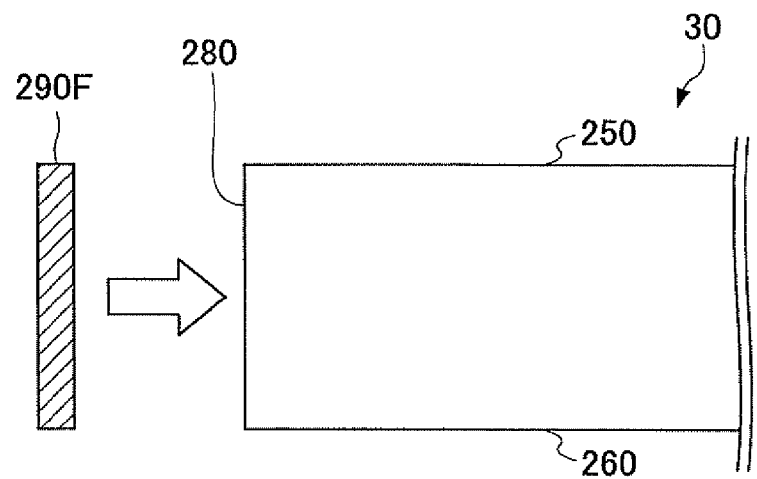
FIG. 4 schematically illustrates an example of a method of forming the inorganic fiber scattering reduction unit on the edge surface of the mat member with a high polymer film.
Figure 5:
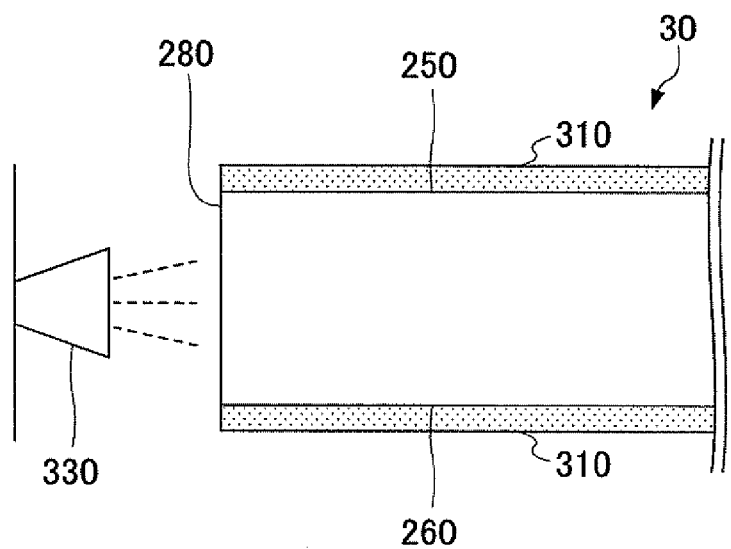
FIG. 5 schematically illustrates an example of a method of forming the inorganic fiber scattering reduction unit on the edge surface of the mat member with organic binder.

Furthermore, the inorganic fiber scattering reduction unit 290 is preferably provided in such a manner as to cover only the edge surfaces 280 of the mat member 30 from the top of the edge surfaces 280, although not limited thereto. With such a configuration, it is possible to minimize the amount of increased organic elements of the mat member 30 that is caused by providing the inorganic fiber scattering reduction unit 290. For example, to form the inorganic fiber scattering reduction unit 290 on the edge surfaces 280 by providing a high polymer film, as shown in FIG. 4, a high polymer film 290F is cut beforehand to a size equal to the region on the edge surface for providing the high polymer film 290F. Furthermore, when the inorganic fiber scattering reduction unit 290 is formed on the edge surfaces 280 by spraying organic binder, as shown in FIG. 5, the areas near the edge surface on the first and second main surfaces 250 and 260 of the mat member 30 are masked beforehand with masking members 310. Subsequently, with the use of an application device 330, the organic binder is sprayed onto the region on the edge surfaces 280 for providing the inorganic fiber scattering reduction unit 290. Accordingly, the inorganic fiber scattering reduction unit 290 is provided only on (a predetermined region of) the edge surfaces 280, so that the inorganic fiber scattering reduction unit 290 is prevented from being provided on the first and second main surfaces 250 and 260 of the mat member 30.

In a case where the inorganic fiber scattering reduction unit 290 is formed by providing a high polymer film on the edge surfaces 280 of the mat member 30, the material and the thickness of such a high polymer film is not particularly limited. For example, it is possible to use CLAF (registered trademark) manufactured by NISSEKI PLASTO CO., LTD, having a thickness of approximately 0.08 mm. Particularly, if the thickness of the high polymer film is to be made less than or equal to approximately 1 mm, it will be possible to prevent the total amount of organic elements in the mat member 30 from significantly increasing as a result of forming the inorganic fiber scattering reduction unit 290 on the edge surfaces 280 of the mat member 30.

Similarly, in a case where the inorganic fiber scattering reduction unit 290 is formed by applying the organic binder on the edge surfaces 280 of the mat member 30, such organic binder is not particularly limited. For example, it is possible to use, as the organic binder, materials that have conventionally been used as the second organic binder of the mat member such as epoxy resin, acrylic resin, rubber resin, styrene resin, or other materials that have not been conventionally used as the second organic binder. For example, preferable materials are acrylic (ACM) resin, acrylonitrile butadiene rubber (NBR) resin, and styrene-butadiene rubber (SBR) resin.

Furthermore, when the inorganic fiber scattering reduction unit 290 is formed by applying the first organic binder, the amount of application on the edge surfaces 280 (hereinafter, "application density P") is not particularly limited. Generally, if the application density P increases, the effect of preventing inorganic fibers from scattering increases accordingly. However, if the application density P exceeds approximately 25 mg/cm$^2$, the effect does not increase much further. Furthermore, the amount of organic elements included in the mat member 30 is preferably minimized in consideration of environmental issues, as described above. Therefore, the application density P is preferably in a range of approximately $0<P\leq$approximately 25 mg/cm$^2$. With such a configuration, the increase in the amount of organic elements included in the mat member 30, which increase is caused by providing the inorganic fiber scattering reduction unit 290, can be limited to less than or equal to approximately 1.5 wt % (accordingly, for example, if the mat member 30 is impregnated beforehand with approximately 1 wt % of organic binder, the total amount of organic elements included in the mat member 30 will be limited to less than or equal to approximately 2.5 wt %). Particularly, as described below, the application density of the first organic binder is preferably approximately less than or equal to 6 mg/cm$^2$. With such a configuration, the increase in the amount of organic elements included in the mat member 30, which increase is caused by providing the inorganic fiber scattering reduction unit 290, can be limited to approximately 0.5 wt % (accordingly, for example, if the mat member 30 is impregnated beforehand with approximately 1 wt % of organic binder, the total amount of organic elements included in the mat member 30 is limited to less than or equal to approximately 1.5 wt %).

The application density P of the first organic binder on the edge surface is calculated as follows. A completed product of the mat member is cut in a width of approximately 5 mm from any one of the edge surfaces, to extract an oblong sample A (sample A is extracted in such a manner that only one surface F of its six surfaces corresponds to the edge surface of the original mat member). Next, sample B is extracted in such a manner that sample B does not include the aforementioned edge surface of the mat member and the region corresponding to approximately 5 mm from the aforementioned edge surface. Next, samples A and B are left in an atmosphere having a temperature of approximately 110° C. for approximately one hour. Then, the weight (mg) of each of samples A and B is measured (expressed as $W_{A1}$, $W_{B1}$, respectively). Then, both samples are fired at a temperature of approximately 600° C. for approximately one hour. Subsequently, the temperature is decreased to room temperature, and the weight (mg) of each of samples A and B is measured once again (expressed as $W_{A2}$, $W_{B2}$, respectively). The obtained values are applied to the following formula to obtain the application density of the first organic binder on the edge surface.

Application density $P$[mg/cm$^2$]={$(W_{A1}-W_{A2})-(W_{B1}-W_{B2})$}/(area [cm$^2$] of surface $F$ of sample $A$)  formula (1)

The present invention is characterized in that the inorganic fiber scattering reduction unit 290 is formed on at least part of the edge surfaces 280 of the mat member 30. Accordingly, it is obvious that the present is not particularly limited by specifications of the mat member itself such as the material of inorganic fibers, the diameters of the fibers, the shape of the mat member, and/or whether films are provided on the first and second main surfaces.

For example, the present invention is applicable to a mat member provided with high polymer films on its main surfaces as in the conventional technology. Alternatively, in a case of a mat member without any high polymer films provided on its main surfaces, the inorganic fiber scattering reduction unit can be formed by applying the first organic binder not only on the edge surfaces but also partly or entirely on the first main surface and/or the second main surface. By forming the inorganic fiber scattering reduction unit also on the first main surface and/or the second main surface, the amount of inorganic fibers scattering from the mat member can be further reduced. However, in this case, the total amount of organic elements included in the mat member may increase considerably. Therefore, it is preferable to adjust the amount of organic elements included in the inorganic fiber scattering reduction unit 290 in such a manner that the total amount of organic elements included in the mat member is, for example less than or equal to approximately 4.5 wt %.

As described above, in the mat member according to the present invention, the edge surfaces of the mat member, where the inorganic fibers primarily scatter from, are treated so as to reduce scattering inorganic fibers. Accordingly, in the mat member according to the present invention, the fibers are sufficiently and effectively prevented from scattering from the mat member while being handled.

Figure 6:
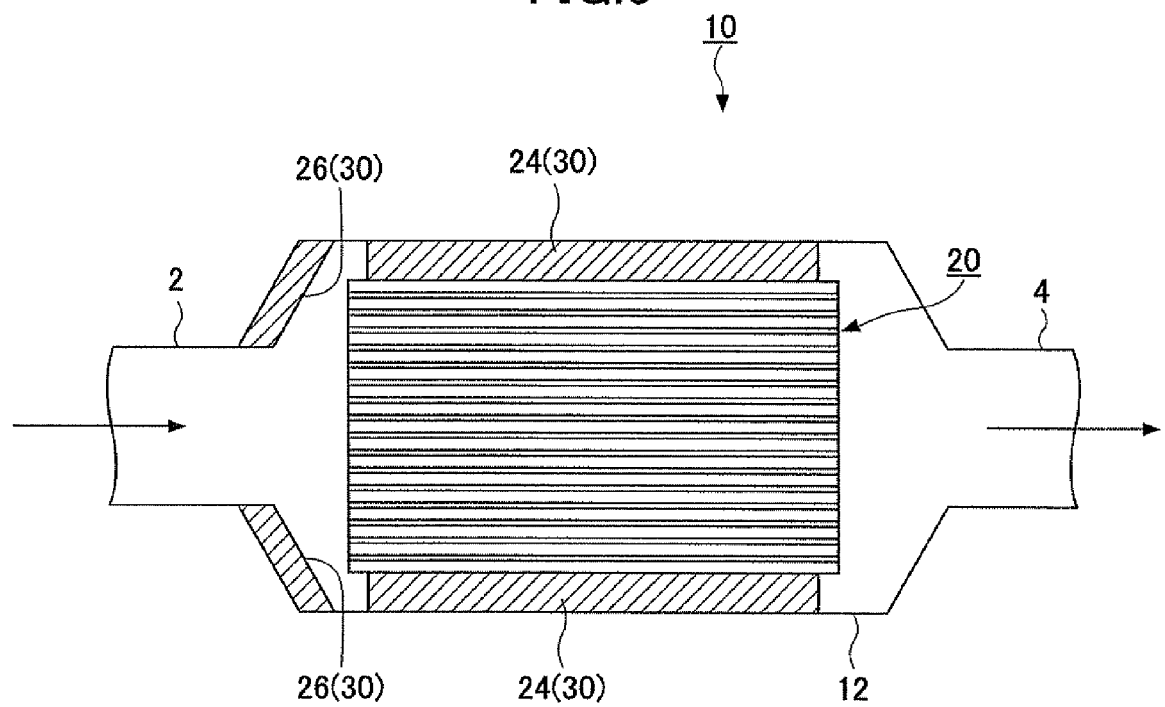
FIG. 6 illustrates an example of a configuration of an exhaust gas treating apparatus according to present invention.

The mat member according to the present invention can be used, for example, as a holding seal member and/or a heat insulator of an exhaust gas treating apparatus 10. FIG. 6 illustrates an example of a configuration of the exhaust gas treating apparatus 10 according to present invention.

The exhaust gas treating apparatus 10 includes the exhaust gas treating body 20 having the holding seal member 24 wound around its peripheral surface, the casing 12 accommodating the exhaust gas treating body 20, and an inlet pipe 2 and an outlet pipe 4 for exhaust gas, which pipes are connected to the inlet side and the outlet side of the casing 12, respectively. The inlet pipe 2 and the outlet pipe 4 are taper-shaped in such a manner that their diameters become greater toward the positions at which they are connected to the casing 12. Furthermore, at the tapering parts of the inlet pipe 2, heat insulators 26 are provided. Therefore, the heat inside the exhaust gas treating apparatus 10 is prevented from being transferred outside via the inlet pipe 2. In the example shown in FIG. 6, the exhaust gas treating body 20 is a catalyst carrier having opening faces corresponding to an inlet and an outlet for exhaust gas and multiple through holes that are in a direction parallel with the gas flow. The catalyst carrier is formed with, for example, porous silicon carbide having a honeycomb structure. However, the exhaust gas treating apparatus 10 according to the present invention is not limited to such a configuration. For example, the exhaust gas treating body 20 can be a DPF in which some of the through holes are sealed.

The holding seal member 24 and the heat insulators 26 are made of the mat member 30 according to the present invention. In such an exhaust gas treating apparatus 10, when the mat members 30 are attached as the holding seal member 24 and the heat insulators 26, scattering inorganic fibers are significantly reduced.

Furthermore, if the mat member 30 according to the present invention is used as the holding seal member 24, it is not necessary to provide high polymer films on both main surfaces of the mat member 30. This is because a sufficient effect of reducing scattering inorganic fibers can be achieved only by forming the inorganic fiber scattering reduction unit 290 on the edge surfaces 280. As high polymer films do not need to be provided on both main surfaces of the mat member 30, the amount of organic elements, which are decomposed by the heat of the exhaust gas and then emitted, can be significantly reduced while the exhaust gas treating apparatus 10 according to the present invention is being used (particularly during usage for the first time). For example, if the mat member 30 is impregnated beforehand with 1 wt % of organic binder, the total amount of organic elements included in the mat member 30 can be limited to less than or equal to 1.5 wt %.

Figure 7:
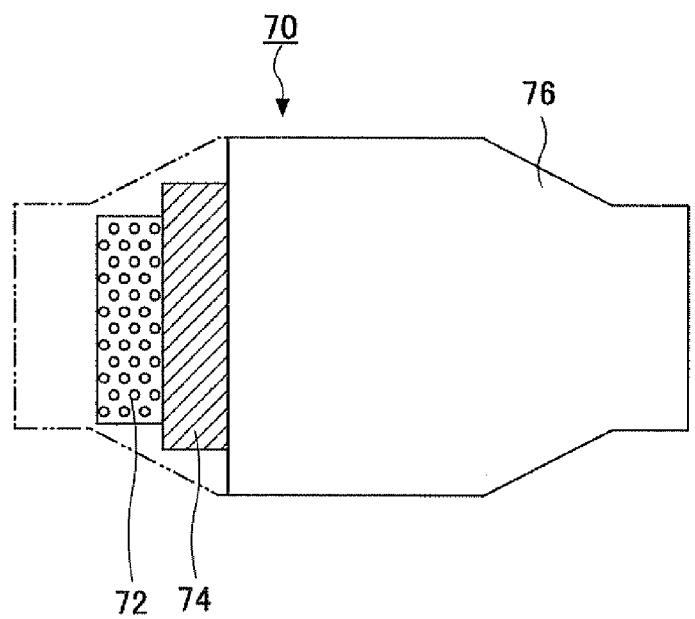
FIG. 7 illustrates a silencing device according to the present invention.

Next, a description is given of another application of the mat member according to the present invention. FIG. 7 illustrates a silencing device including the mat member according to the present invention. This silencing device is provided in the middle of an exhaust pipe of an engine of, for example, a vehicle. A silencing device 70 includes an inner pipe 72 (for example, made of metal such as stainless steel), an outer shell 76 covering its outside (for example, made of metal such as stainless steel), and a sound absorbing member 74 provided between the inner pipe 72 and the outer shell 76. Usually, multiple pores are provided on the surface of the inner pipe 72. With this silencing device 70, when exhaust gas flows through the inside of the inner pipe 72, noise components included in the exhaust gas can be attenuated with the sound absorbing member 74.

The mat member 30 according to the present invention can be used as the sound absorbing member 74. By using the mat member 30 according to the present invention as the sound absorbing member 74, it is possible to significantly reduce scattering inorganic fibers that may scatter at the time of attaching the sound absorbing member 74 to the silencing device 70.

In the following, a description is given of an example of a method of fabricating the mat member 30 according to the present invention. It is obvious to those skilled in the art that the mat member 30 can be fabricated by a method other than the method described below.

Figure 8:
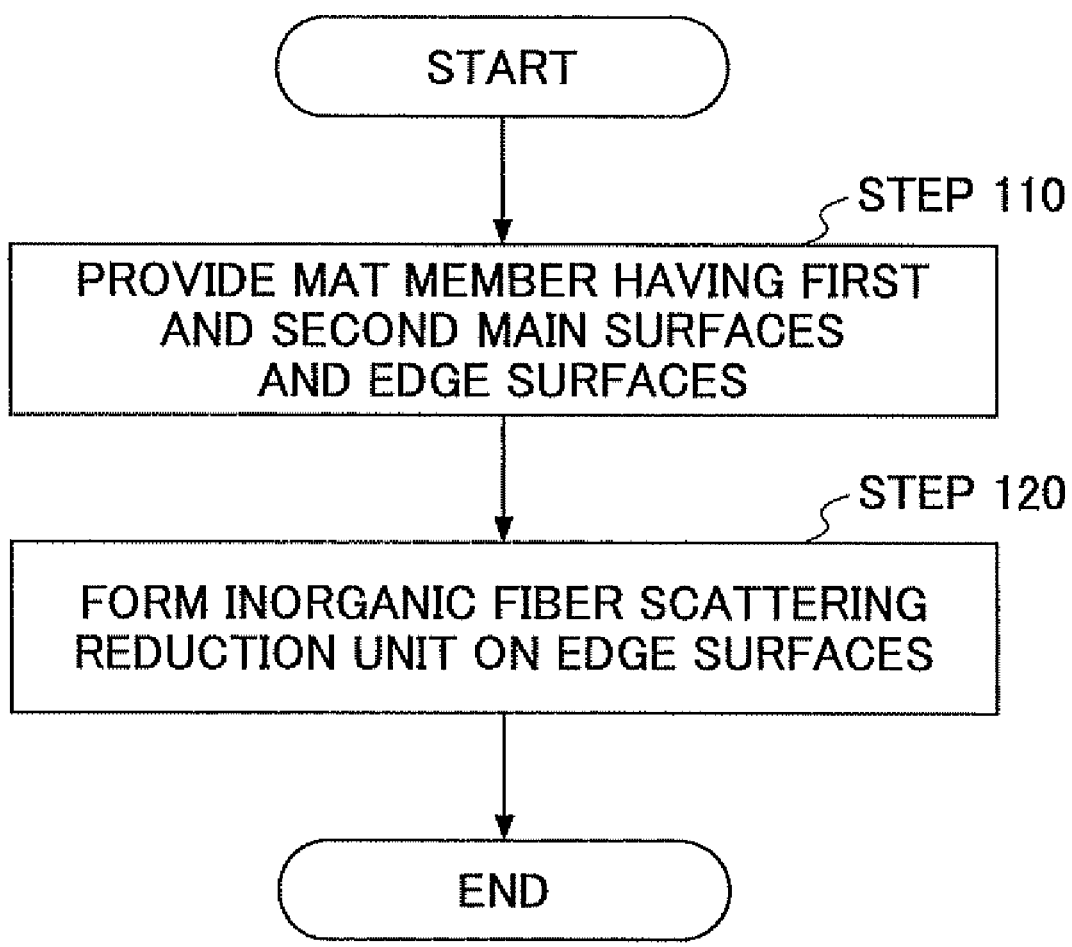
FIG. 8 is a flowchart of a method of fabricating the mat member according to the present invention.

FIG. 8 is a flowchart of the method of fabricating the mat member 30 according to the present invention. The method of fabricating the mat member 30 according to the present invention includes a step (step 110) of providing a mat member having a first main surface, a second main surface, and edge surfaces, and a step (step 120) of forming the inorganic fiber scattering reduction unit on at least part of the edge surfaces of the mat member. Each step is described in detail in the following.

(Step 110)

First, a laminated sheet made of inorganic fiber is fabricated. In the following description, a mixture of alumina and silica is used as inorganic fiber. The fiber material is not limited thereto; for example, the fiber material can be either one of alumina or silica. Silica sol is added to a basic aluminum chloride aqueous solution in which the aluminum content is approximately 70 g/l and the atom ratio is Al/Cl=approximately 1.8, so that the composition ratio of alumina:silica becomes for example, approximately 60 through 80: approximately 40 through 20, thereby preparing a precursor of inorganic fiber. Particularly, the composition ratio of alumina:silica is more preferably approximately 70 through 74: approximately 30 through 26. If the relative proportion of alumina is less than approximately 60%, the composition ratio of the mullite, which is generated from alumina and silica, decreases. Accordingly, the completed mat member tends to have high heat conductivity.

Next, an organic polymer such as polyvinyl alcohol is added to the precursor of alumina fiber. Subsequently, this liquid is concentrated to prepare a spinning solution. This spinning solution is used in a spinning operation performed by a blowing process.

The blowing process is a spinning method performed with the use of airflows blown out from air nozzles and spinning solution flows pressed out from spinning solution supplying nozzles. The gas flow speed from slits of each air nozzle is usually approximately 40 m/s through approximately 200 m/s. The diameter of each spinning solution supplying nozzle is usually approximately 0.1 mm through approximately 0.5 mm, and the liquid amount per spinning solution supplying nozzle is usually approximately 1 ml/h through approximately 120 ml/h, more preferably approximately 3 ml/h through approximately 50 ml/h. Under such conditions, the spinning solution pressed out from the spinning solution supplying nozzles is sufficiently extended without turning into a spray form (mist form), and the fibers are not deposited onto each other. Accordingly, by optimizing the spinning conditions, it is possible to form a uniform precursor with a narrow fiber diameter distribution.

The average length of the fabricated alumina fibers is preferably greater than or equal to approximately 250 μm, and more preferably greater than or equal to approximately 500 μm. If the average length of the fibers is more than or equal to 250 μm, the fibers will sufficiently interlace each other, and the strength will be sufficient. Furthermore, the average diameter of the inorganic fibers is preferably in a range of approximately 3 μm through 8 μm, and more preferably in a range of approximately 5 μm through 7 μm, although not particularly limited thereto.

The precursors that have undergone the spinning process are laminated to each other so that a laminated sheet is fabricated. Then, needling processing is performed on the laminated sheet. In the needling processing, needles are inserted in and pulled out from the laminated sheet to reduce the thickness of the sheet. A needling device is usually used for the needling processing.

Generally, a needling device includes a needle board capable of reciprocating (usually up and down) in the direction that needles are inserted in and pulled out from the laminated sheet, and a pair of supporting plates disposed one plate on each the side of the front surface and the side of the back surface of the laminated sheet. The needle board has multiple needles to be inserted in the laminated sheet, which needles are arranged at a density of, for example, approximately 25 needles/100 cm$^2$ through 5,000 needles/100 cm$^2$. Each supporting plate has multiple through holes for the needles. When the pair of supporting plates is pressed one plate against each side of the laminated sheet, the needle board is moved toward and away from the laminated sheet. Accordingly, the needles are inserted in and pulled out from the laminated sheet, and multiple needle traces are formed in the interlaced fibers.

In another configuration, the needling device can include a set of two needle boards. Each needle board has a corresponding support plate. The two needle boards are respectively disposed on the front surface and the back surface of the laminated sheet, so that the laminated sheet is held by the supporting plates on both sides. The needles on one of the needle boards are arranged in such a manner that their positions do not coincide with those on the other needle board during the needling processing. Furthermore, each of the support plates has multiple through holes that are arranged in consideration of the positions of the needles on each of the needle boards, so that the needles do not abut the support plate when the needling processing is performed from both sides of the laminated sheet. Such a device can be used to sandwich the laminated sheet from both sides with the two supporting plates and perform the needling processing from both sides of the laminated sheet with the two needle boards. By performing the needling processing by the above method, the process time can be reduced.

Next, the laminated sheet that has undergone the above needling processing is heated starting at normal temperature, and is continuously fired at a maximum temperature of approximately 1,250° C. to form a mat member having a predetermined basis weight (weight per unit area).

Usually, in order to facilitate the handling of the mat member, the mat member formed as above is impregnated with organic binder (second organic binder) such as resin from the side of the first main surface. However, if the mat member is impregnated with the organic binder, and such a mat member is included in an exhaust gas treating apparatus, an increased amount of organic elements are emitted from the apparatus while the apparatus is being used. Therefore, in the following steps, the amount of the organic binder included in the mat member (the weight of the organic binder with respect to the total weight of the mat member) is within a range of, for example, approximately 1.0 wt % through approximately 4.0 wt %, although this may vary according to the amount of organic elements included in the inorganic fiber scattering reduction unit formed on the edge surfaces of the mat member. Accordingly, the total amount of organic elements included in the completed mat member can be, at the most, less than or equal to a value (approximately 4.5 wt % with respect to the total weight of the mat member) of a mat member currently used as a holding seal member.

Examples of the organic binder are epoxy resin, acrylic resin, rubber resin, styrene resin, or the like. For example, acrylic (ACM) resin, acrylonitrile-butadiene rubber (NBR) resin, styrene-butadiene rubber (SB R) resin, or the like, can be used.

(Step 120)

The mat member manufactured as described above is cut into a predetermined shape (for example, the shape shown in FIG. 2).

Next, the inorganic fiber scattering reduction unit is formed on part of or on the entirety of the peripheral edge surfaces of the cut mat member. To form the inorganic fiber scattering reduction unit, a high polymer film can be provided on the edge surfaces of the mat member by a heat-sealing process or by an adhering process with the use of an adhesive. Alternatively, the inorganic fiber scattering reduction unit can be formed by directly spraying a composition including the first organic binder onto the edge surfaces, or by applying such a composition with a brush. In the case of the spray application method, for example, organic binder including styrene butadiene is used.

Subsequently, a process of drying the mat member is performed, thereby achieving the mat member having the inorganic fiber scattering reduction unit formed on its edge surfaces.

PRACTICAL EXAMPLES

In the following, effects of the present invention are described with practical examples.

Fabrication of Mat Member According to Practical Example 1

Silica sol was added to a basic aluminum chloride aqueous solution in which the aluminum content is 70 g/l and the atom ratio is Al/Cl=1.8, so that the composition ratio of alumina fiber became $Al_2O_3:SiO2$-72:28, thereby forming a precursor of alumina fiber. Next, polyvinyl alcohol was added to this precursor of alumina fiber. Then, this liquid was concentrated to prepare a spinning solution. This spinning solution was used in a spinning operation performed by a blowing process. The flow rate of conveying carrier gas (air) was 52 m/s, and the supplying speed of the spinning solution was 5.3 ml/h.

Subsequently, the precursors of alumina fiber were folded and laminated to each other so that a raw material mat of alumina fiber was fabricated.

Next, needling processing was performed on this raw material mat. The needling processing was performed from one side of the raw material mat by disposing a needle board, on which needles are arranged at a density of 80 needles/100 $cm^2$, only on one side of the raw material mat.

Subsequently, the resultant raw material mat was continuously fired at a temperature ranging from a normal temperature to a maximum temperature of 1,250° C. for an hour. Next, the resultant sheet member was impregnated with organic binder (second organic binder) from its first main surface. As the organic binder, an acrylate latex emulsion was used, and the impregnation amount was 1 wt % with respect to the total weight of the raw material mat (including the organic binder).

Next, the mat member fabricated as above, having a thickness of 7.3 mm and a basis weight of 1,160 $g/m^2$, was cut into a size of 100 mm ×100 mm.

Next, by the above described method, styrene-butadiene (first) organic binder (spray type adhesive Z-2 manufactured by Konishi Co., Ltd.) was sprayed onto the entirety of the peripheral edge surfaces of the mat member, thereby forming the inorganic fiber scattering reduction unit on the entirety of the peripheral edge surfaces. The application density of the first organic binder was 1.8 $mg/cm^2$. The mat member formed in such a manner corresponds to practical example 1.

Practical Examples 2 Through 5

Mat members (of practical examples 2 through 5), each having the inorganic fiber scattering reduction unit provided around the entirety of the peripheral edge surfaces, were fabricated by the same method as that of practical example 1. However, in practical example 2, the application density of the organic binder was 6.2 $mg/cm^2$, in practical example 3, the application density of the organic binder was 10.7 $mg/cm^2$, in practical example 4, the application density of the organic binder was 15.1 $mg/cm^2$, and in practical example 5, the application density of the organic binder was 24.3 $mg/cm^2$.

Practical Examples 6 Through 8

Mat members, each having the inorganic fiber scattering reduction unit provided on the peripheral edge surfaces, were fabricated by the same method as that of practical example 1. However, in practical example 6, the inorganic fiber scattering reduction unit was formed by spraying the aforementioned organic binder only on a region of the edge surfaces corresponding to 25% of the entirety of the edge surfaces of the mat member. In practical example 7, the inorganic fiber scattering reduction unit was formed by spraying the aforementioned organic binder only on a region of the edge surfaces corresponding to 50% of the entirety of the edge surfaces of the mat member. In practical example 8, the inorganic fiber scattering reduction unit was formed by spraying the aforementioned organic binder only on a region of the edge surfaces corresponding to 75% of the entirety of the edge surfaces of the mat member. In all of the practical examples, the application density of the organic binder in the inorganic fiber scattering reduction unit was 1.8 mg/cm².

Practical Example 9

A mat member including the inorganic fiber scattering reduction unit was fabricated by the same method as that of practical example 1. However, in practical example 9, the first organic binder was also sprayed on the entirety of one of the main surfaces (first main surface) of the mat member. Therefore, the inorganic fiber scattering reduction unit was formed not only around the entirety of the edge surfaces of the mat member, but also on the entirety of one of the main surfaces (first main surface) of the mat member. The application density of the first organic binder in the inorganic fiber scattering reduction unit (on the edge surfaces and on the first main surface) was 1.8 mg/cm².

Practical Example 10

A mat member including the inorganic fiber scattering reduction unit was fabricated by the same method as that of practical example 1. However, in practical example 10, the first organic binder was also sprayed on the entirety of both of the main surfaces (first and second main surfaces) of the mat member. Therefore, the inorganic fiber scattering reduction unit was formed not only around the entirety of the edge surfaces of the mat member, but also on the entirety of both of the main surfaces (first and second main surfaces) of the mat member. The application density of the first organic binder in the inorganic fiber scattering reduction unit (on the edge surfaces and on the first and second main surfaces) was 1.8 mg/cm².

Practical Example 11

A mat member having the inorganic fiber scattering reduction unit provided on the entirety of the peripheral edge surfaces of the mat member was fabricated by the same method as that of practical example 1. However, in practical example 11, before spraying the first organic binder on the edge surfaces of the mat member, high polymer films (having a thickness of 0.08 mm, manufactured by NISSEKI PLASTO CO., LTD) were heat-sealed on the entirety of both main surfaces of the mat member. The application density of the first organic binder in the inorganic fiber scattering reduction unit on the edge surfaces was 1.8 mg/cm².

Comparative Example 1

A mat member was fabricated by the same method as that of practical example 1. However, in comparative example 1, the inorganic fiber scattering reduction unit was not formed on the edge surfaces of the mat member.

Comparative Example 2

A mat member was fabricated by the same method as that of practical example 1. However, in comparative example 2, high polymer films (having a thickness of 0.08 mm, manufactured by NISSEKI PLASTO CO., LTD) were heat-sealed on the entirety of both main surfaces of the mat member.

(Measurement of Organic Element Amount)

The total amount of organic elements included in each of the above mat members was measured. The total amount of organic elements was measured as follows.

After the mat member sample (100 mm ×100 mm) was dried at a temperature of 110° C. for one hour, the weight (mg) of the sample was measured (weight before firing). Next, the sample was fired at a temperature of 600° C. for one hour. Subsequently, the temperature was decreased to room temperature, and the weight (mg) of the sample is measured once again (weight after firing). The obtained values are applied to the following formula to obtain the total amount of organic elements in the mat member.

$$\text{Total amount of organic elements [\%]} = \{(\text{weight before firing} - \text{weight after firing})/(\text{weight before firing})\} \times 100 \quad \text{formula (2)}$$

Table 1 indicates the measurement results of the total amounts of organic elements obtained for mat members.

TABLE 1

| SAMPLE | PORTION OF FORMING INORGANIC FIBER SCATTERING REDUCTION UNIT | PROPORTION OF AREA OF INORGANIC FIBER SCATTERING REDUCTION UNIT ON EDGE SURFACE WITH RESPECT TO ENTIRE EDGE SURFACE (%) | APPLICATION DENSITY OF ORGANIC BINDER ON EDGE SURFACE (mg/cm²) | APPLICATION DENSITY OF ORGANIC BINDER ON FIRST AND/OR SECOND MAIN SURFACE (mg/cm²) | TOTAL ORGANIC ELEMENT AMOUNT (%) | INORGANIC FIBER SCATTERING RATE (%) |
|---|---|---|---|---|---|---|
| PRACTICAL EXAMPLE 1 | ENTIRE EDGE SURFACE | 100 | 1.8 | — | 1.13 | 0.17 |
| PRACTICAL EXAMPLE 2 | ENTIRE EDGE SURFACE | 100 | 6.2 | — | 1.4 | 0.15 |
| PRACTICAL EXAMPLE 3 | ENTIRE EDGE SURFACE | 100 | 10.7 | — | 1.66 | 0.15 |
| PRACTICAL EXAMPLE 4 | ENTIRE EDGE SURFACE | 100 | 15.1 | — | 1.92 | 0.15 |
| PRACTICAL EXAMPLE 5 | ENTIRE EDGE SURFACE | 100 | 24.3 | — | 2.46 | 0.15 |
| PRACTICAL EXAMPLE 6 | EDGE SURFACE | 25 | 1.8 | — | 1.03 | 0.23 |
| PRACTICAL EXAMPLE 7 | EDGE SURFACE | 50 | 1.8 | — | 1.07 | 0.21 |
| PRACTICAL EXAMPLE 8 | EDGE SURFACE | 75 | 1.8 | — | 1.10 | 0.19 |
| PRACTICAL EXAMPLE 9 | ENTIRE EDGE SURFACE + FIRST MAIN SURFACE | 100 | 1.8 | 1.8 | 2.94 | 0.10 |

TABLE 1-continued

| SAMPLE | PORTION OF FORMING INORGANIC FIBER SCATTERING REDUCTION UNIT | PROPORTION OF AREA OF INORGANIC FIBER SCATTERING REDUCTION UNIT ON EDGE SURFACE WITH RESPECT TO ENTIRE EDGE SURFACE (%) | APPLICATION DENSITY OF ORGANIC BINDER ON EDGE SURFACE (mg/cm$^2$) | APPLICATION DENSITY OF ORGANIC BINDER ON FIRST AND/OR SECOND MAIN SURFACE (mg/cm$^2$) | TOTAL ORGANIC ELEMENT AMOUNT (%) | INORGANIC FIBER SCATTERING RATE (%) |
|---|---|---|---|---|---|---|
| PRACTICAL EXAMPLE 10 | ENTIRE EDGE SURFACE + FIRST AND SECOND MAIN SURFACES | 100 | 1.8 | 1.8 (ON BOTH MAIN SURFACES) | 4.39 | 0.04 |
| PRACTICAL EXAMPLE 11 | ENTIRE EDGE SURFACE + FIRST AND SECOND MAIN SURFACES (FIRST AND SECOND MAIN SURFACES ARE COVERED BY HIGH POLYMER FILMS) | 100 | 1.8 | — | 4.38 | 0.03 |
| COMPARATIVE EXAMPLE 1 | NONE | 0 | 0 | — | 1 | 0.25 |
| COMPARATIVE EXAMPLE 2 | FIRST AND SECOND MAIN SURFACES (COVERED BY HIGH POLYMER FILMS) | 0 | 0 | — | 3.97 | 0.19 |

(Scattering Property Test of Inorganic Fibers)

Figure 9:
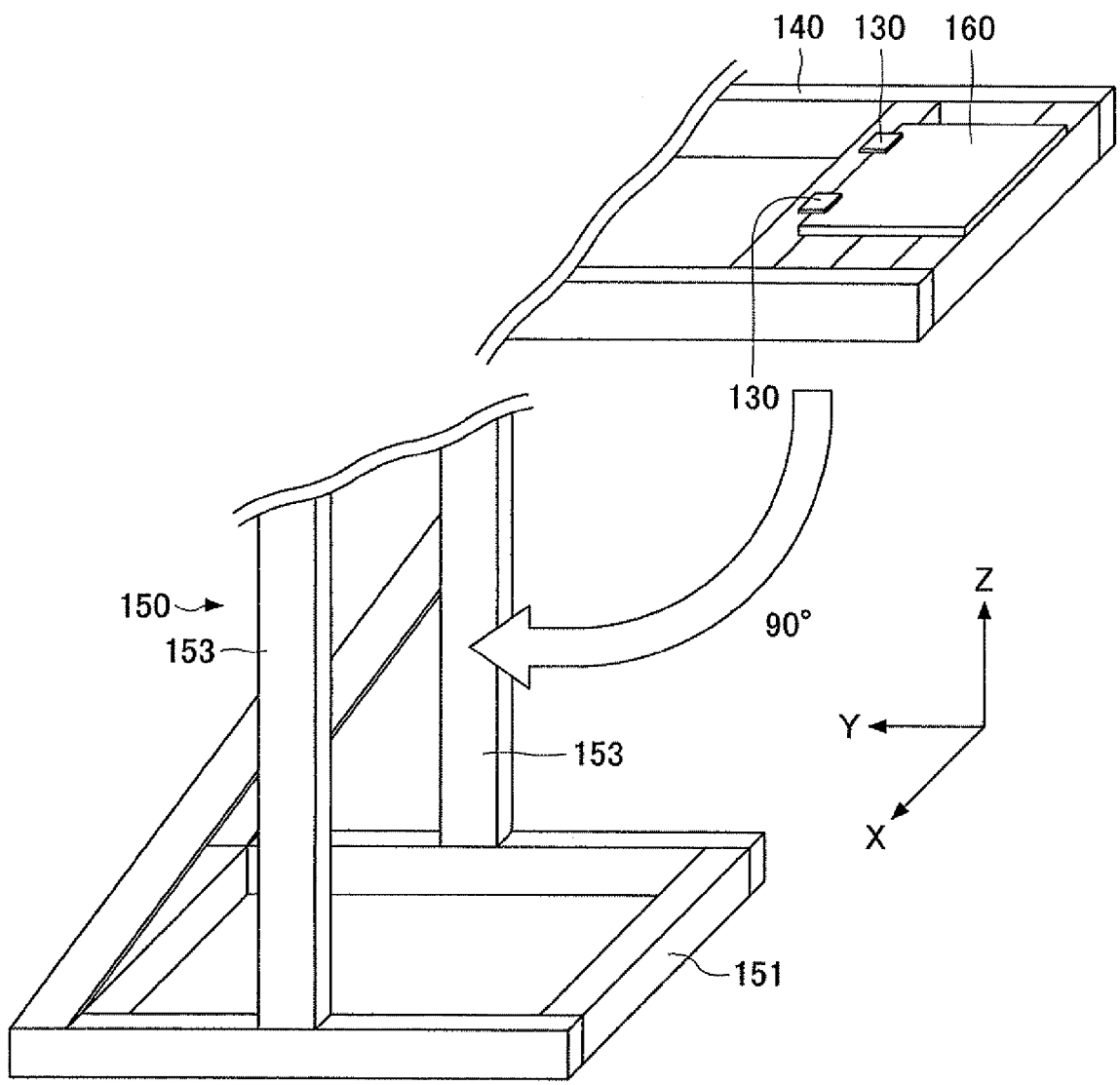
FIG. 9 schematically illustrates a part of a test device for testing scattering properties of inorganic fibers.

An inorganic fiber scattering property test was performed for each of the above described mat members. FIG. 9 illustrates part of a test device.

The inorganic fiber scattering property test was performed as follows. First, each of the mat members (100 mm×100 mm) was used as a test sample 160. As shown in FIG. 9, two clips 130 were used to fix the test sample 160 onto the end of an arm frame 140 (total length 915 mm, width 322 mm) protruding from a test device 110. The arm frame 140 has its other end connected to a vertical frame 150 of the test device 110. The vertical frame 150 is disposed in such a manner as to be upright on a base frame part 151. Furthermore, the vertical frame 150 has a main plane parallel to the XZ plane indicated in FIG. 9 (height in Z direction (excluding height of base frame part 151) 1,016 mm ×width in X direction 322 mm). As shown in FIG. 9, two metal columns 153 comprise the vertical frame 150, each being 25 mm thick in both the X direction and the Y direction. The arm frame 140 can rotate in a plane (YZ plane) that is perpendicular to the main plane of the vertical frame 150, pivoting on an end part that is connected to the top end (not shown) of the vertical frame 150. The arm frame 140 can rotate by up to 90° relative to the main plane of the vertical frame 150. To perform the test, the arm frame 140 is first held at 90° with respect to a vertical direction (i.e., held horizontal), and is then dropped. As a result, the arm frame 140 rotates 90° in the direction indicated by the arrow, along the YZ plane, and accordingly, the sample 160 also rotates in the direction indicated by the arrow. The arm frame 140 finally collides with the metal columns 153 of the vertical frame 150. Due to this collision, some of the inorganic fibers scatter from the sample 160. After the test, the sample 160 is gently removed from the clips 130. Then, the scattering rate of the inorganic fibers is obtained by the following formula.

Scattering rate of inorganic fibers [%]=(weight of mat member sample before test-weight of mat member sample after test)/(weight of mat member sample before test)×100    formula (3)

The above Table 1 indicates the results of the scattering property test obtained from the mat members. The results in Table 1 say that in the mat members of practical examples 1 through 11 having the inorganic fiber scattering reduction units provided on at least part of the edge surfaces (the application density of the first organic binder being 1.8 mg/cm$^2$ through 24.3 mg/cm$^2$), the amounts of scattering inorganic fibers are significantly smaller than that of the mat member without the inorganic fiber scattering reduction unit provided on its edge surfaces (comparative example 1).

Figure 10:
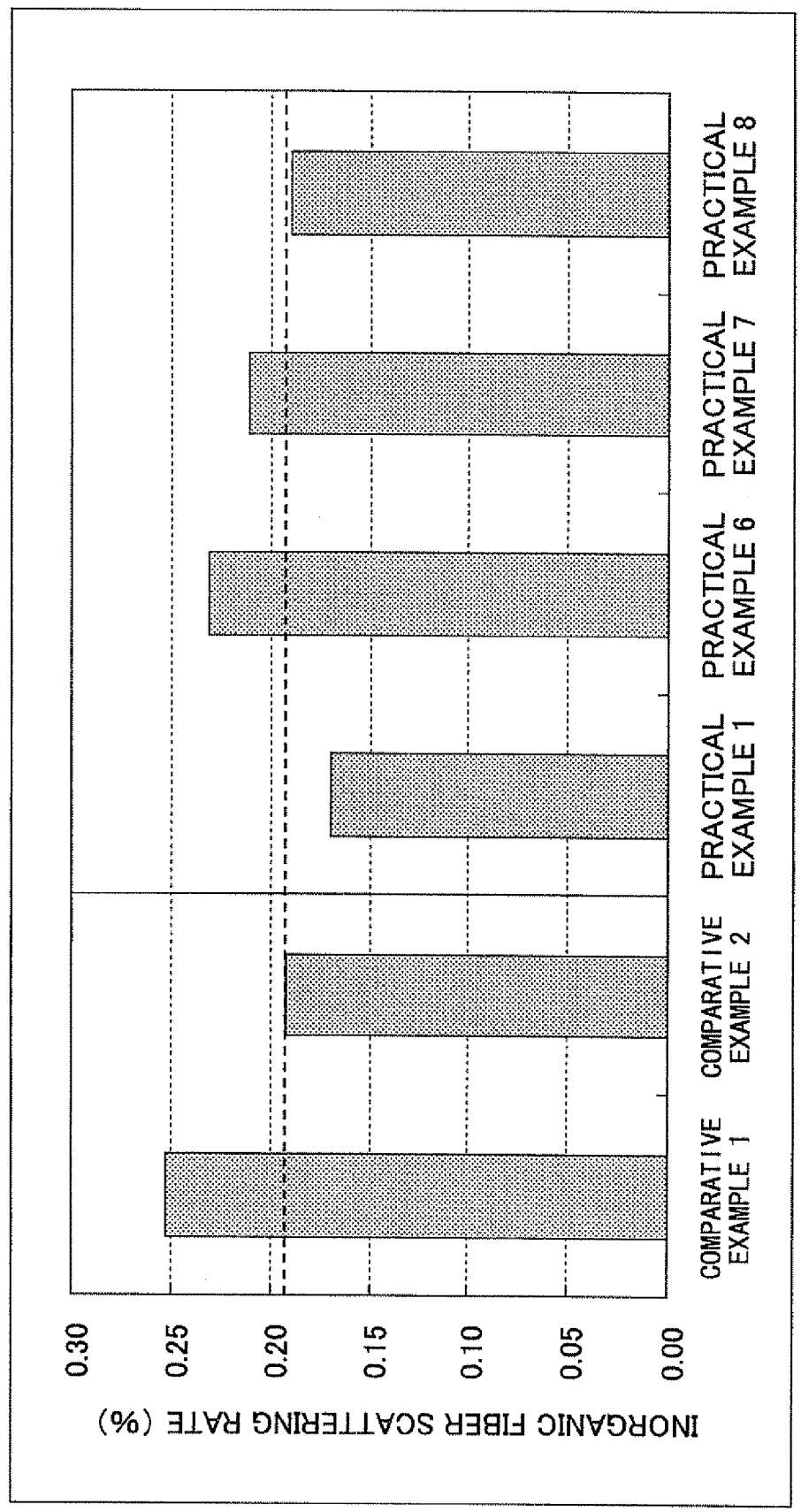
FIG. 10 illustrates the comparison results of inorganic fiber scattering rates of the mat members of comparative examples 1, 2 and practical examples 1 and 6 through 8.

FIG. 10 indicates the comparison results of the inorganic fiber scattering rates of the mat members of comparative examples 112 and practical examples 1, and 6 through 8. Upon comparing the inorganic fiber scattering rates of the mat members of practical examples 1, and 6 through 8, it is found that as the proportion of the region on the edge surfaces provided with the inorganic fiber scattering reduction unit with respect to the entire region of the edge surfaces of the mat member (hereinafter, "edge surface coverage proportion") increases, the scattering rate of the inorganic fibers scattering from the mat members decrease (it is to be noted that the edge surface coverage proportion is 25% in practical example 6, the edge surface coverage proportion is 50% in practical example 7, the edge surface coverage proportion is 75% in practical example 8, and the edge surface coverage proportion is 100% in practical example 1). Furthermore, even if the inorganic fiber scattering reduction unit is not provided on the entirety of the edge surfaces of the mat member according to the present invention, the scattering inorganic fibers are reduced to a certain degree. That is, upon comparing the results for comparative example 2 with those for the above practical examples, it is found that the inorganic fiber scattering rate is further reduced when the edge surface coverage proportion of the mat member is 75% or more (practical example 8, practical example 1) compared to the conventional mat member having films provided on both main surfaces (comparative example 2).

Figure 11:
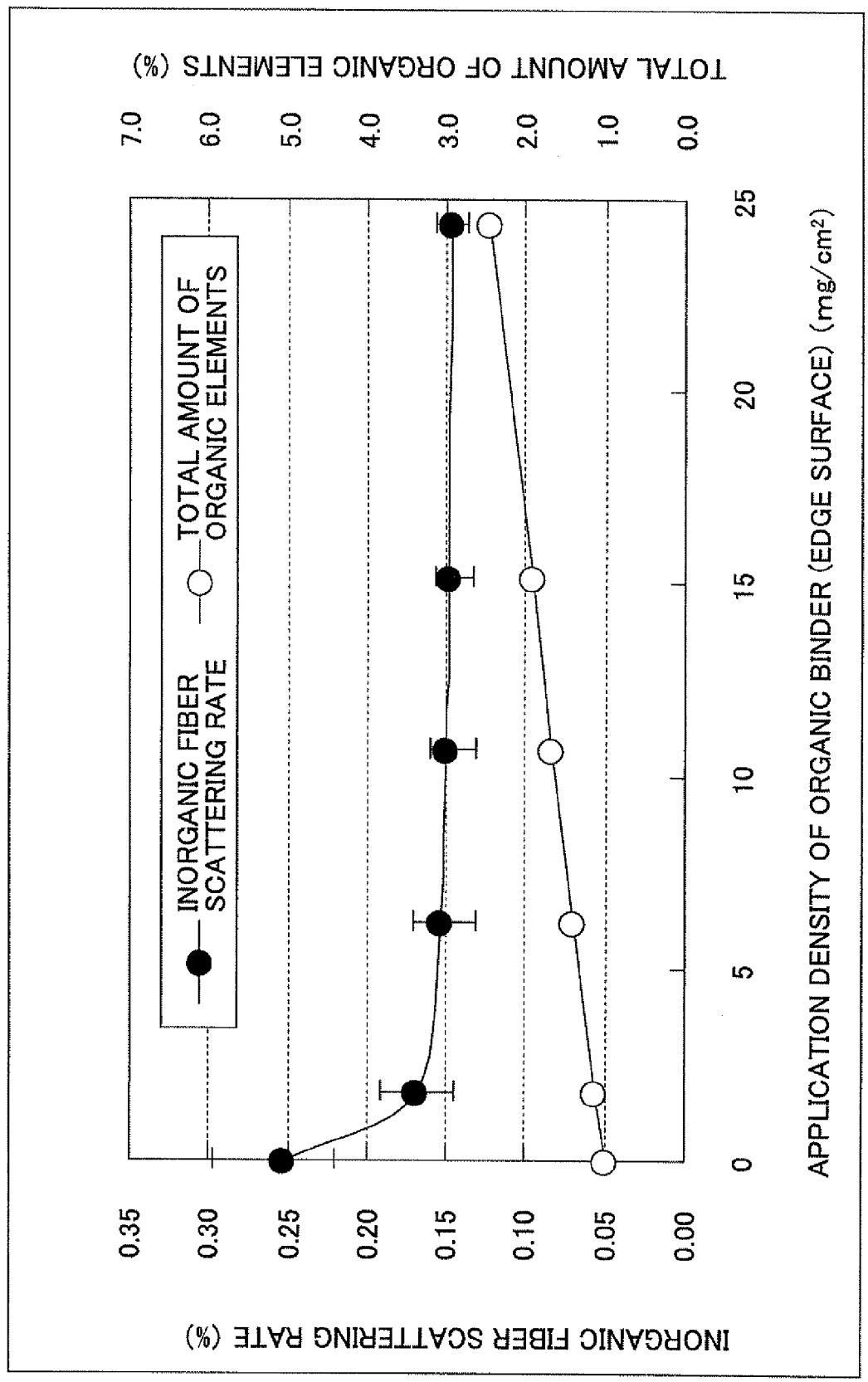
FIG. 11 illustrates the relationship between the inorganic fiber scattering rate with respect to the application density of the first organic binder on the edge surfaces.

FIG. 11 illustrates the relationship between the inorganic fiber scattering rate and the total amount of organic elements with respect to the application density of organic binder on the edge surfaces of a mat member having the inorganic fiber scattering reduction unit formed on the entirety of its peripheral edge surfaces. Results shown in FIG. 11 say that as long as the application density P of the first organic binder is less than or equal to 25 mg/cm$^2$, even if the inorganic fiber scattering reduction unit is formed on the entirety of the peripheral edge surfaces, the total amount of organic elements included in the mat member is limited to less than or equal to 2.5 wt % (including 1.5 wt % of the organic elements in the inorganic fiber scattering reduction unit). In FIG. 11, when the application density is within a range of zero through 6 mg/cm$^2$, the scattering rate decreases significantly. Beyond this point, the effect of decreasing the scattering rate by increasing the application density tends to decrease. Accordingly, in consideration of further reducing the total amount of organic elements, the application density of organic binder in the inorganic fiber scattering reduction unit on the edge surfaces is most preferably less than or equal to 6 mg/cm$^2$. In this case, the increased amount of organic elements included in a mat member as a result of forming the inorganic fiber scattering reduction unit on the edge surfaces can be limited to approximately 0.5 wt %.

As indicated with practical examples 9 through 11, a mat member, which has the inorganic fiber scattering reduction unit formed also on one or both of the main surfaces, is even more effective in reducing scattering inorganic fibers. Accordingly, it is obvious that the inorganic fiber scattering reduction unit can be formed not only on the edge surfaces but also on the main surfaces, as long as the total amount of organic elements emitted from the mat member during usage does not exceed a predetermined upper limit.

The mat member and the exhaust gas treating apparatus according to the present invention can be applied as a holding seal member and a heat insulator of an exhaust gas treating apparatus used in a vehicle, and as a sound absorbing member of a silencing device.

According to an embodiment of the present invention, a mat member includes inorganic fibers; a first main surface and a second main surface; and an edge surface surrounding the first main surface and the second main surface, wherein an inorganic fiber scattering reduction unit is formed on at least a part of the edge surface of the mat member, which inorganic fiber scattering reduction unit is configured to reduce scattering of the inorganic fibers.

The inorganic fiber scattering reduction unit can include an organic substance.

The inorganic fiber scattering reduction unit can include a high polymer film or a first organic binder.

The first organic binder can be selected from a group consisting of an epoxy resin, an acrylic resin, a rubber resin, and a styrene resin.

The application density P of the first organic binder is preferably within a range of approximately $0 < P <$ approximately 25 mg/cm$^2$.

The inorganic fiber scattering reduction unit is preferably formed in a region corresponding to approximately 75% through approximately 100% of a total area of the edge surface.

The inorganic fiber scattering reduction unit can be formed on at least one of the first main surface and the second main surface.

The inorganic fiber scattering reduction unit formed on at least one of the first main surface and the second main surface can include a high polymer film.

The inorganic fibers include alumina and silica.

The mat member can include at least one of an inorganic binder and a second organic binder at a location other the first main surface, the second main surface, and the edge surface.

The mat member can include organic elements corresponding to greater than 0 wt % and less than or equal to approximately 4.5 wt % with respect to a total weight of the mat member, more particularly greater than 0 wt % and less than or equal to approximately 2.5 wt % with respect to a total weight of the mat member.

According to an embodiment of the present invention, a method of fabricating a mat member including inorganic fibers, a first main surface and a second main surface, and an edge surface surrounding the first main surface and the second main surface, includes a step of forming an inorganic fiber scattering reduction unit on at least a part of the edge surface of the mat member, which inorganic fiber scattering reduction unit is configured to reduce scattering of the inorganic fibers.

The step of forming the inorganic fiber scattering reduction unit can include a step of applying an organic binder on at least the part of the edge surface of the mat member.

The method can include a step of forming the inorganic fiber scattering reduction unit on at least one of the first main surface and the second main surface.

The step of forming the inorganic fiber scattering reduction unit on at least one of the first main surface and the second main surface can include a step of providing a high polymer film on at least one of the first main surface and the second main surface.

According to an embodiment of the present invention, an exhaust gas treating apparatus includes an exhaust gas treating body including two opening faces through which exhaust gas flows; a holding seal member wound around at least a part of an outer peripheral surface of the exhaust gas treating body except for the opening faces; and a cylindrical member configured to accommodate the exhaust gas treating body having the holding seal member wound therearound, wherein the holding seal member includes the above mat member.

According to an embodiment of the present invention, an exhaust gas treating apparatus includes an inlet pipe and an outlet pipe for exhaust gas; and an exhaust gas treating body disposed between the inlet pipe and the outlet pipe, wherein a heat insulator is provided on at least a part of the inlet pipe; and the heat insulator includes the above mat member.

The exhaust gas treating body can include a catalyst carrier or an exhaust gas filter.

According to an embodiment of the present invention, a silencing device includes an inner pipe; an outer shell covering an outer periphery of the inner pipe; and a sound absorbing member disposed between the inner pipe and the outer shell, wherein the sound absorbing member includes the above mat member.

Obviously, numerous modifications and variations of the present invention are possible in light of the above teachings. It is therefore to be understood that within the scope of the appended claims, the invention may be practiced otherwise than as specifically described herein.

What is claimed is:

1. A method of fabricating a mat member comprising inorganic fibers, the method comprising:
   providing a first main surface;
   providing a second main surface opposite to the first main surface;
   providing an edge surface surrounding the first main surface and the second main surface;
   providing an organic binder in the mat member, an amount of the organic binder provided in the mat member being adjusted according to an amount of an inorganic fiber scattering reduction unit provided on the mat member; and
   providing the inorganic fiber scattering reduction unit on only at least a part of the edge surface of the mat member from the top of the edge surface, the inorganic fiber scattering reduction unit being configured to reduce scattering of the inorganic fibers.

2. The method according to claim 1, wherein providing the inorganic fiber scattering reduction unit comprises applying an organic binder on the at least the part of the edge surface of the mat member.

3. The method according to claim 1, further comprising adjusting the amount of organic binder to include organic elements corresponding to greater than 0 wt % and less than or equal to 4.5 wt % with respect to a total weight of the mat member.

* * * * *